(12) United States Patent  
Ozluturk

(10) Patent No.: US 7,236,785 B2
(45) Date of Patent: Jun. 26, 2007

(54) SEAMLESS HANDOFF SYSTEM AND METHOD

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 500 days.

(21) Appl. No.: 10/777,387

(22) Filed: Feb. 12, 2004

(65) Prior Publication Data

US 2005/0003820 A1    Jan. 6, 2005

Related U.S. Application Data

(63) Continuation of application No. 09/575,437, filed on May 22, 2000, now Pat. No. 6,754,497, which is a continuation of application No. 09/342,457, filed on Jun. 29, 1999, now Pat. No. 6,122,511, which is a continuation of application No. 08/947,719, filed on Oct. 9, 1997, now Pat. No. 5,960,347.

(51) Int. Cl.
*H04Q 7/20* (2006.01)

(52) U.S. Cl. .................. 455/436; 455/442; 370/331; 370/342

(58) Field of Classification Search ............ 455/428, 455/442, 525, 436–437; 370/331, 342, 335
See application file for complete search history.

(56) References Cited

U.S. PATENT DOCUMENTS 5,574,968 A * 11/1996 Olds et al. ............... 455/428
5,673,307 A * 9/1997 Holland et al. ............ 455/436
5,697,053 A * 12/1997 Hanly ....................... 375/130
5,752,187 A * 5/1998 Frank et al. ............... 455/428

FOREIGN PATENT DOCUMENTS

EP     0 565 507 A    10/1993
WO     WO 96/16524 A   5/1996

* cited by examiner

*Primary Examiner*—CongVan Tran
(74) *Attorney, Agent, or Firm*—Volpe & Koenig, P.C.

(57) ABSTRACT

A multicellular communications system where transmission between a roving subscriber and multiple base station transceivers is maintained throughout the territory. Each mobile subscriber unit has global code seeds for the entire communications system or an updated neighbor list and continuously searches to access available cell base stations while maintaining a communication link with one base station. Candidate cell base stations are interrogated and communicated with. The candidate base station that requires less transmitting energy from the mobile subscriber unit is closely monitored. When the mobile subscriber unit can successfully communicate with less transmit power than currently required by the present base station, the mobile subscriber unit is handed off to the candidate base station transceiver.

8 Claims, 7 Drawing Sheets

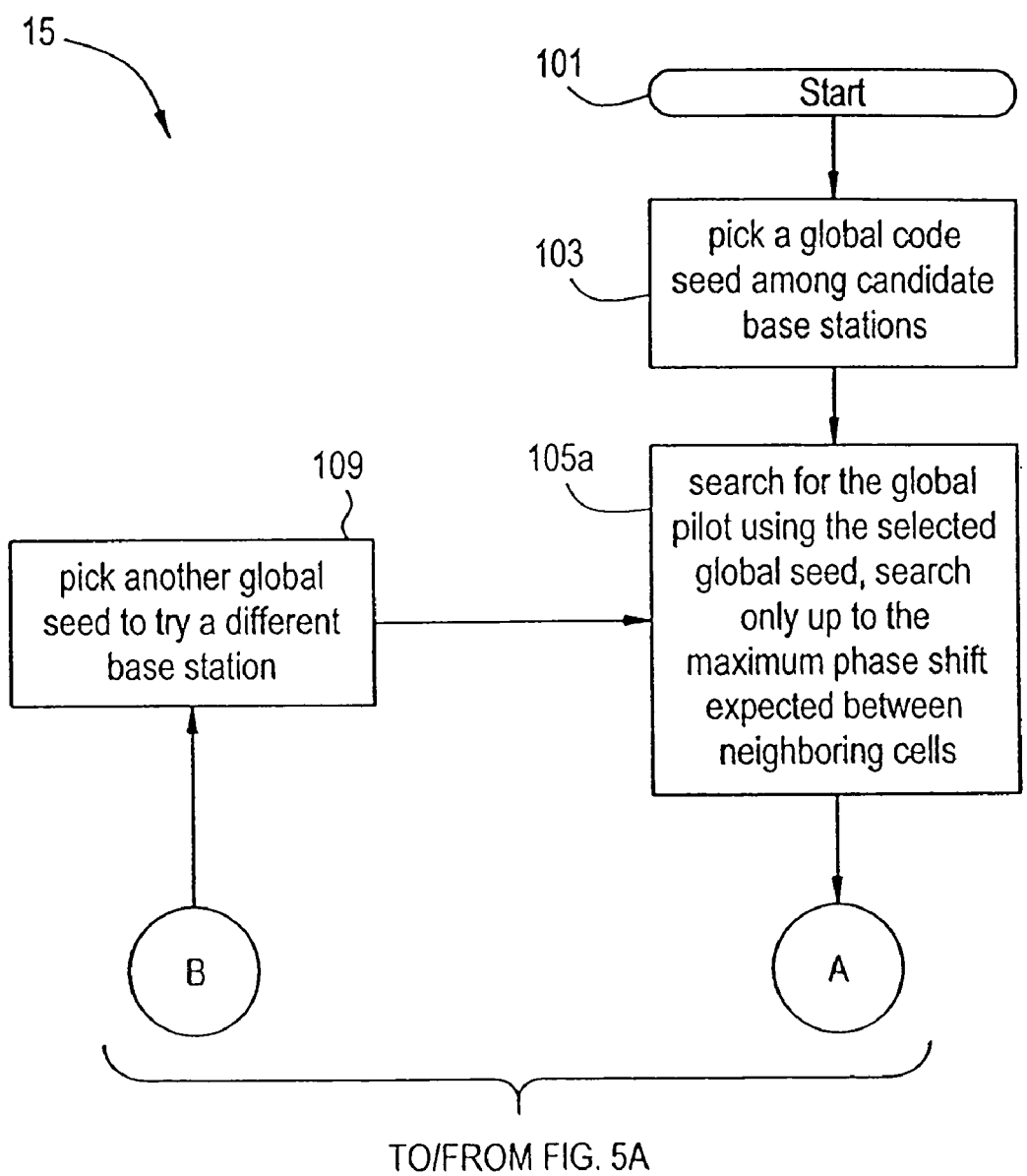

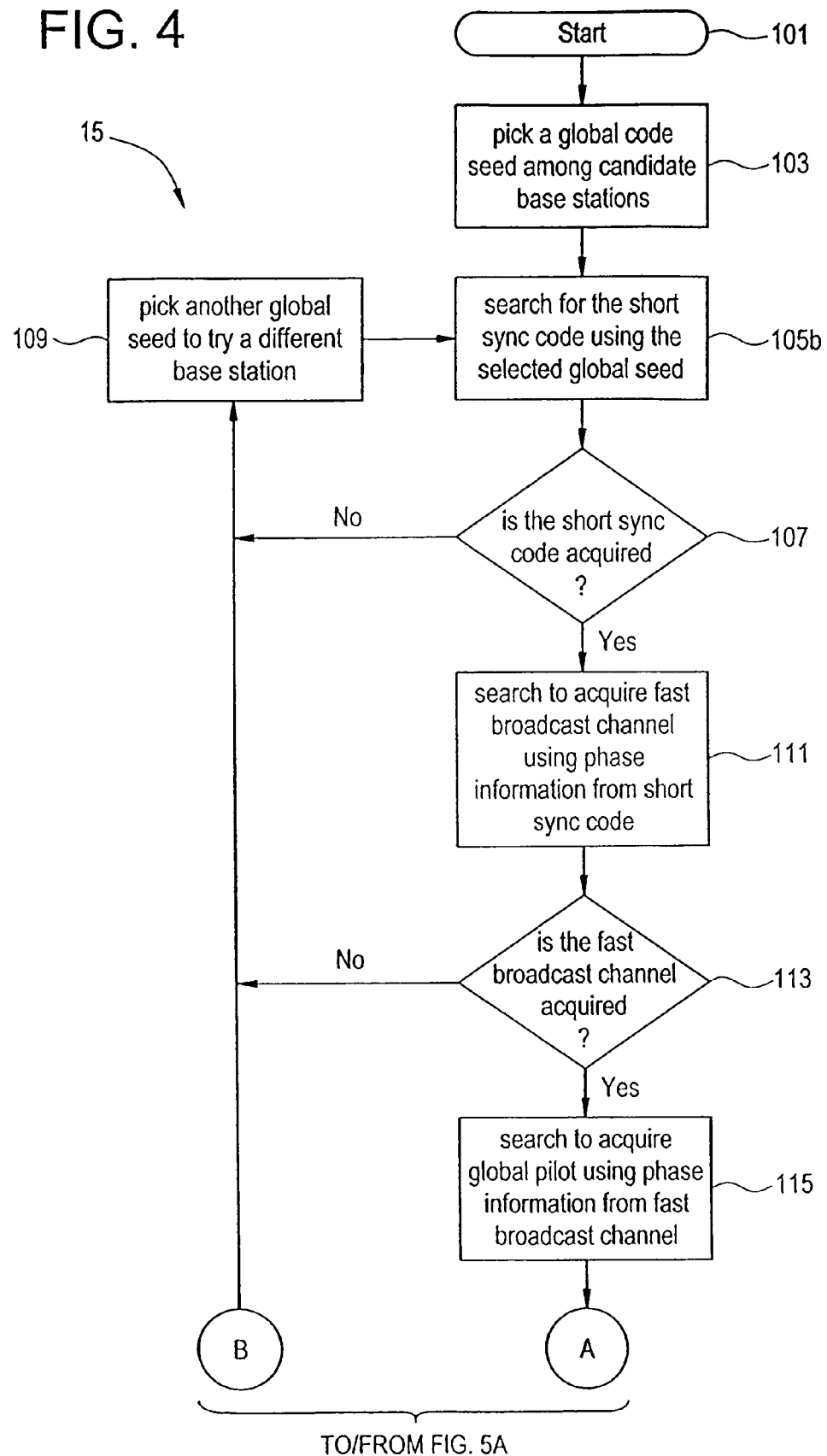

SEAMLESS HANDOFF SYSTEM AND METHOD

CROSS REFERENCE TO RELATED APPLICATION(S)

This application is a continuation of U.S. patent application Ser. No. 09/575,437, filed May 22, 2000 now U.S. Pat. No. 6,754,497; which is a continuation of application Ser. No. 09/342,457, filed Jun. 29, 1999; which issued as U.S. Pat. No. 6,122,511 on Sep. 19, 2000, which is a continuation of application Ser. No. 08/947,719, filed Oct. 9, 1997, which issued as U.S. Pat. No. 5,960,347 on Sep. 28, 1999, which are incorporated by reference as if fully set forth.

FIELD OF INVENTION

The present invention relates generally to communication systems. More specifically, the invention relates to a system and method for controlling handoff between individual cells for a mobile subscriber in a multicellular communication environment.

BACKGROUND

Handoff is a general term describing the function of transferring a communication signal for a mobile subscriber from one base station transceiver to another base station transceiver as the subscriber negotiates the cellular territory. There are two general methods of conducting handoff in a cellular communication system, soft and hard handoff. Quality may suffer using either handoff method as the mobile subscriber switches base stations between individual cells.

Hard handoff typically occurs near the boundaries between cells. Through continuous measurements of received signal power from a mobile subscriber, the base station where the subscriber has established communication determines if the power is reduced below a nominal value near the cell boundary. The hard handoff to a candidate cell's base station occurs instantaneously without disrupting the call in progress. The received power at the candidate cell's base station is much greater than required to ensure an ideal handoff. The difference between the current cell's power and the candidate cell's power significantly reduces capacity by interfering with other users.

A soft handoff occurs throughout a given range of distances from the current and candidate cells' base stations. In the soft handoff method, the user is connected to both base stations as he travels near the common cell boundary. The decision to switch is made depending upon the reception of the mobile subscriber's pilot signal. A central switching center decides at what point one of the base stations should be dropped. Shared communication is performed for a finite period of time, during which transmission from the current and candidate cells is required.

In a typical CDMA communication system, the plurality of signals are transmitted within the same frequency band. Frequency reuse not only applies to users in the same cell, but also to those in all other cells. Since the same frequencies are used, the transmitted power levels from the mobile subscriber and the base station must be monitored closely. If power control is not strictly adhered to, the overall transmission interference and the total number of usable channels is adversely affected. Therefore, the number of signals which can be successfully transmitted and received is associated with the total power of all users.

Both soft and hard handoff methods have shortcomings. Hard handoff can potentially suffer from high drop-out rates. The soft handoff method requires a duplication of transmission resources from the current base station and a base station from at least one candidate cell. The mobile subscriber must establish two concurrent communication links, thereby requiring twice the transmission power which would otherwise be required. The increase in transmission power wastes power and air capacity and contributes to total system interference while the handoff is taking place. The power or energy transmitted in a CDMA system by each user must be kept at the minimum necessary to convey information and to minimize interference with the other users. Careful control of transmission power also contributes to extended use of portable devices relying on battery power. Furthermore, diversity combining of the duplicate signals at the central switching center is cumbersome unless the delay from both cell base stations is nearly identical.

Accordingly, there exists a need for an efficient, fast and reliable handoff method.

SUMMARY

The present invention relates to a multicellular communication system where transmission between a roving subscriber and multiple base station transceivers is maintained. Each mobile subscriber unit has global code seeds for the entire communications system and continuously searches to access available cell base stations while maintaining a communication link with one base station. Candidate cell base stations interrogate and communicate with the mobile subscriber unit. The candidate base station that requires the least transmit power from the mobile subscriber unit is closely monitored. When the mobile subscriber unit can successfully communicate with less transmit power than currently required by the current base station, the mobile subscriber unit renders the decision to be handed off to the candidate base station transceiver.

Accordingly, it is an object of the present invention to provide an efficient system and method for handoff between individual cells in a multicellular communications environment.

It is a further object of the invention to provide a system and method permitting the mobile subscriber unit to handoff between cells in a multicellular transmission system with reduced complexity and interference.

Other objects and advantages of the invention will become apparent to those skilled in the art after reading the detailed description of the preferred embodiment.

BRIEF DESCRIPTION OF THE DRAWING(S)

FIG. 3 is a flowchart of the handoff method embodying the present invention when synchronized.

FIG. 4 is a flow chart of the handoff method embodying the present invention when not synchronized.

DETAILED DESCRIPTION OF THE PREFERRED EMBODIMENT(S)

Figure 1:
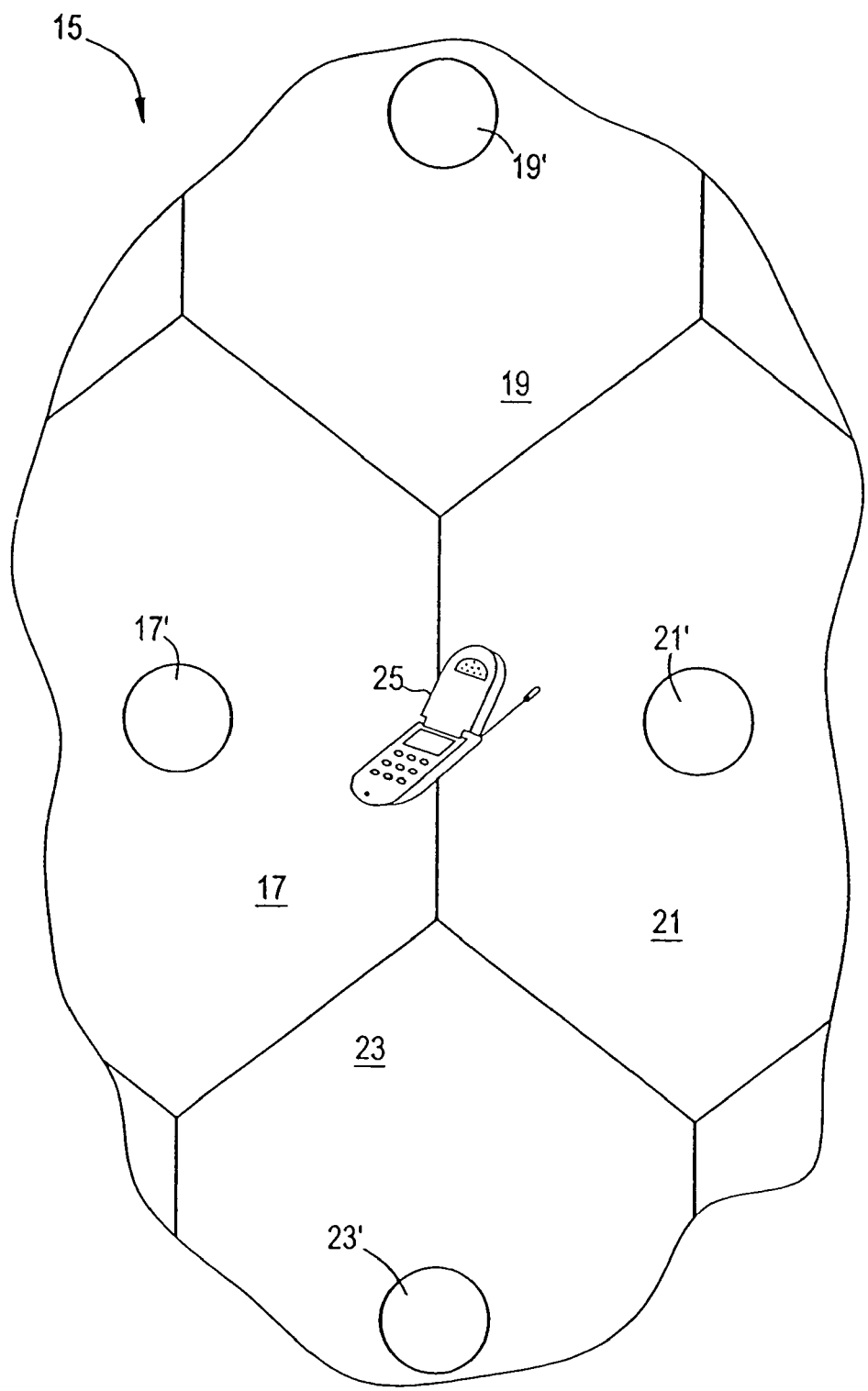
FIG. 1 is a handoff system incorporating the present invention.

The present invention is described with reference to the drawing figures where like numerals represent like elements throughout.

Figure 2:
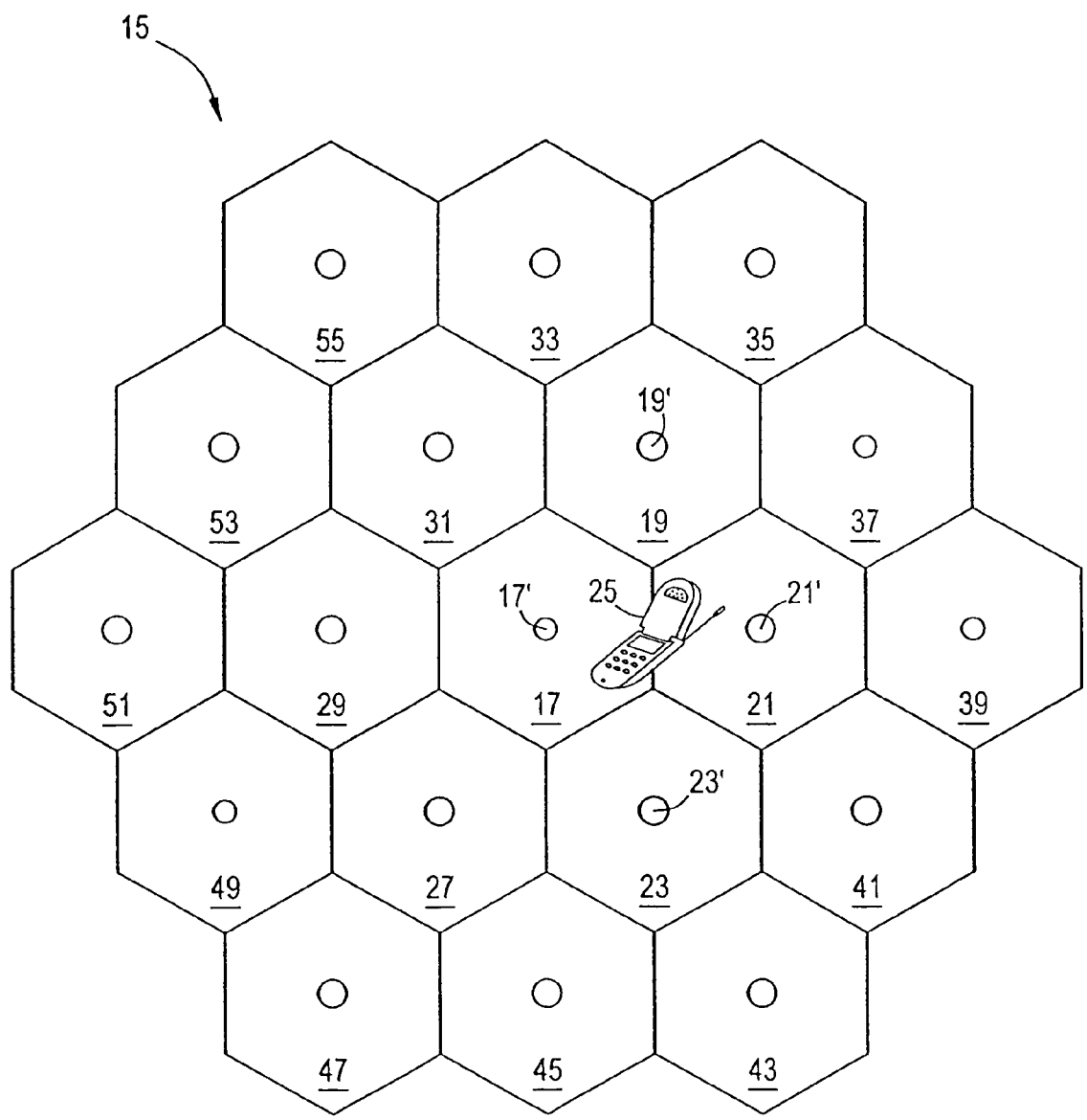
FIG. 2 is a handoff system incorporating the present invention.

A system diagram illustrating the handoff system and method 15 of the present invention is shown in FIGS. 1 and 2. Four cells 17, 19, 21, 23 of a multicellular telecommunications system 15 are shown with their respective base station transceivers 17', 19', 21', 23'. For clarity, none of the individual cells have been sectorized. A mobile subscriber unit 25 is shown near a common boundary between two of the individual cells 17, 21.

In operation, assuming that the mobile subscriber unit 25 is communicating with the first base station 17', as the mobile subscriber unit 25 moves from one cell location to another, the mobile subscriber unit 25 continues to communicate with the first base station 17' while the mobile subscriber unit 25 performs an analysis of the transmissions of other base stations 19', 21', 23' within the system 15. At this point, only one traffic channel has been established between the mobile subscriber unit 25 and the base station 17'.

In operation, the mobile subscriber unit 25 of the present invention constantly receives transmissions from base stations 17', 19', 21', 23' and others within communicating range of the mobile subscriber unit 25. The mobile subscriber unit 25 may continuously search to find a new communication link which requires less transmitting power, or search only when the transmitting power to the existing link approaches a threshold near maximum. In order to establish a new communication link, the mobile subscriber unit 25 must first synchronize with a candidate base station transceiver. Synchronization is the process whereby the mobile subscriber unit 25 must align its locally generated pseudorandom code with the phase shifted code received from the candidate base station. The transmission from the candidate base station includes a short code, which is transmitted by the candidate base station transceiver and is used by the mobile subscriber unit 25 to determine phase ambiguity for synchronization. The mobile subscriber unit 25 locally generates a replica of the global pilot that is transmitted from the base station. The mobile subscriber unit 25 then correlates the received signal with the locally generated replica of the global pilot code. If the received and locally generated pilot codes are aligned, the code phase has been found, otherwise the mobile subscriber unit 25 changes the phase of the local code and continues the search until a match is found. The mobile subscriber unit 25 performs the search from a set of global code seeds stored in memory to determine if the received pilot code matches one of the global code seeds. The memory of the mobile subscriber unit 25 may contain a small "neighbor list" or it may include all of the global codes used in the system 15. As shown in FIG. 2, the neighbor list may include six cells 19, 21, 23, 27, 29, 31 in the first tier and twelve cells 33, 35, 37, 39, 41, 43, 45, 47, 49, 51, 53, 55, in the second tier. The neighbor list typically includes the nearest 18 global codes to the existing link base station since the mobile subscriber unit 25 will most likely transition to one of these cells.

Global seeds are assigned to base stations and are used in a base station's service area to spread the global channels. Base stations are also given primary seeds from which the base station generates assigned seeds. These assigned seeds are assigned to individual links between the base station and the subscriber units and are used to spread assigned channels. The global code seeds are preprogrammed within each mobile subscriber unit 25. The mobile subscriber unit 25 can alternatively acquire the global code seeds by periodically receiving an updated list broadcast from each base station transceiver in the system 15.

The mobile subscriber unit 25 receives the plurality of transmitted short codes from other base stations and uses them to accelerate the acquisition of the global pilots from the base stations. The mobile subscriber unit 25 continuously searches all global code seeds in memory until it finds a match by checking the short codes broadcast by each base station. The mobile subscriber unit 25 only has to examine the short code to determine the global code for the cell. If the mobile subscriber unit 25 does not recognize a short code, it aborts an attempt to synchronize to that base station and examines another received code.

When synchronization between the mobile subscriber unit 25 and the candidate base station is complete, which will be described in more detail later in the specification, the mobile subscriber unit 25 transmits another symbol length short code while gradually increasing the transmit power level. The mobile subscriber unit 25 monitors the candidate base station for an acknowledgment signal, which acts as a "traffic light" to determine if the base station receives and acknowledges the short code. The transmit power ramp-up ceases upon two conditions: 1) if the short code transmit power is within a predetermined switching differential for a finite period of time when compared with the current power level of the pilot to the existing base station; or, 2) the candidate base station acknowledges the detection of the short code and informs the mobile subscriber unit 25 via the traffic light. The switching differential between the power levels of the existing link and the candidate link is to prevent toggling back and forth between two base stations when both transmitting power levels are close in magnitude. If the short code transmission requires a higher transmission power level than the current pilot power level, no handoff occurs.

The handoff process does not require that the base stations be synchronized. However, if the base stations are synchronized, it is easier for the mobile subscriber unit 25 to detect and synchronize to a candidate base station. If the base stations are not synchronized, the base stations transmit a short sync code in addition to the global pilot. The mobile subscriber unit 25 employs a multiple stage acquisition process where the mobile subscriber unit 25 first acquires the short sync code and then uses the phase information obtained to accelerate the acquisition of the global pilot. In a system where the base stations are synchronized, there is no need for the short sync code, the mobile subscriber unit 25 can acquire the global pilot quickly since the relative phase difference between pilots from neighboring cell base stations is small.

Figure 5A:
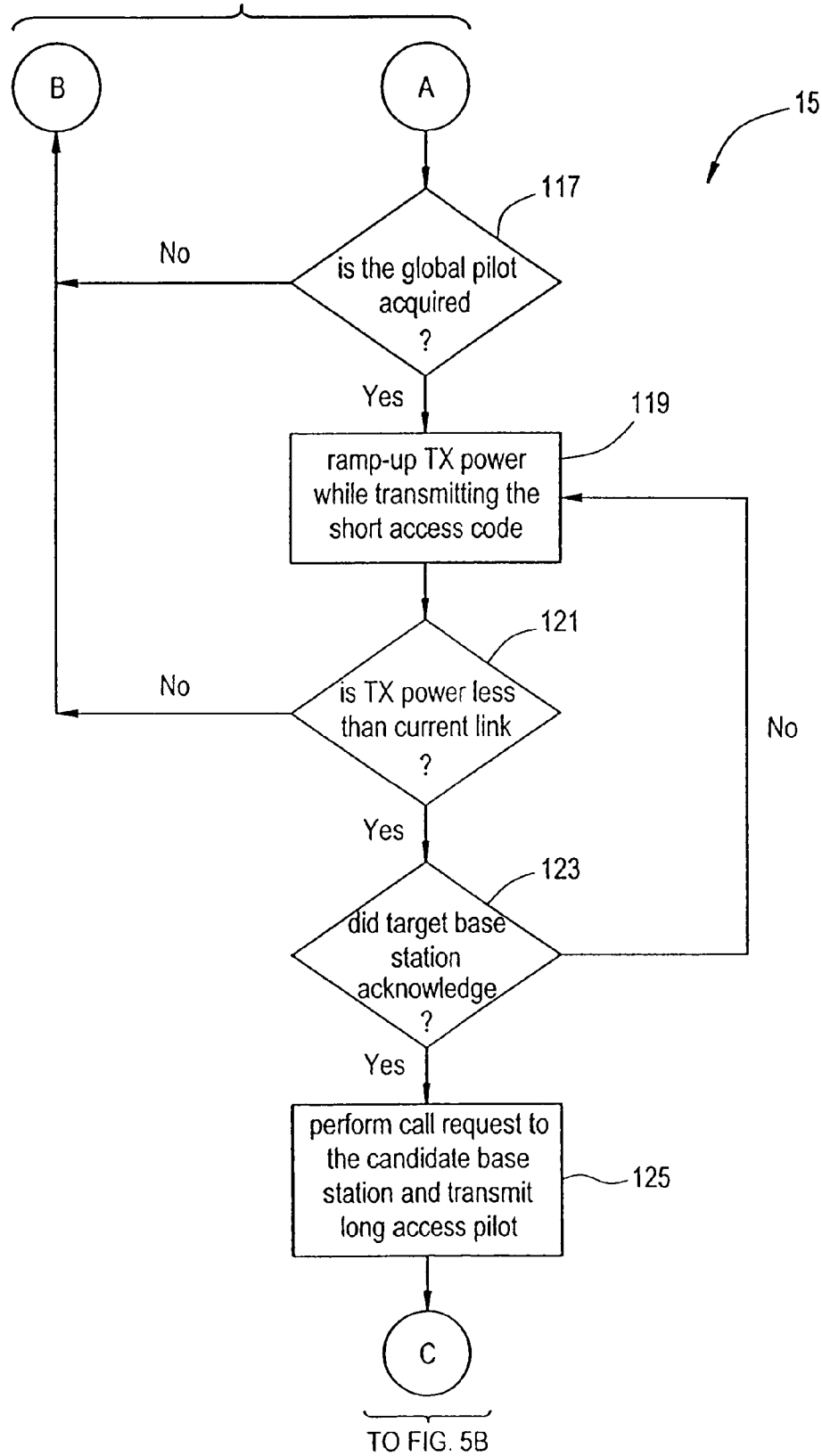
FIGS. 5A and 5B are flow charts of the handoff method embodying the present invention.
Figure 5B:
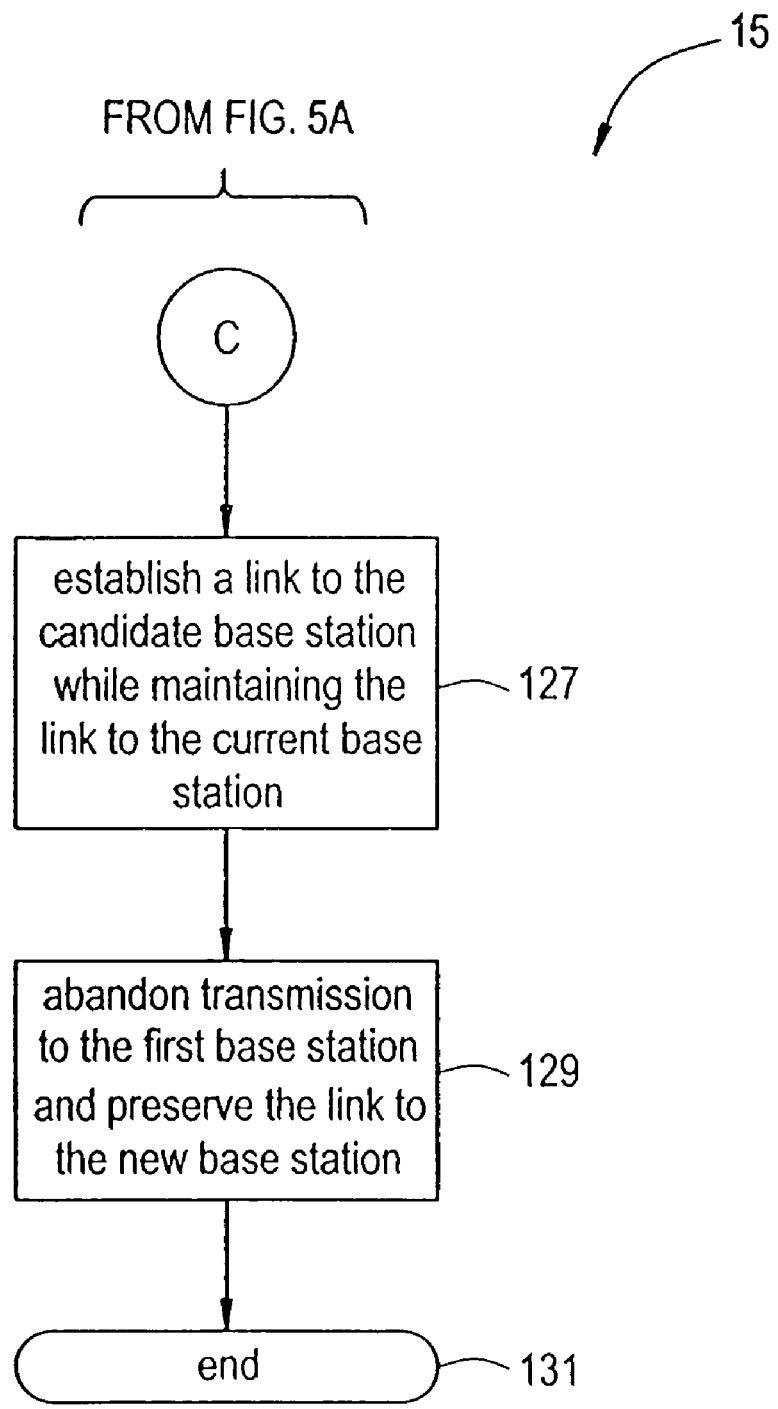

Referring now to FIGS. 3, 4, and 5A–5B, a flowchart illustrating the preferred method with either synchronized or non-synchronized base stations is shown. When the individual cell base station transceivers are synchronized (as shown in FIGS. 3, 5A–5B), the process 15 begins (step 101) by receiving a sequence of short codes broadcast from available cell base station transceivers within the communicating range. The set of stored global code seeds within each mobile subscriber unit 25 (step 103) are used to generate the short codes and are compared against the received short codes broadcast from a candidate cell base station (step 105a). The mobile subscriber unit 25 can acquire the global pilot signal from a candidate base station transceiver in less than 10 ms while maintaining a current communication link. To acquire a pilot signal from a non-synchronized candidate cell base station transceiver could approach 3 seconds. Since the non-synchronous case is unacceptably long, a multilevel search is undertaken to synchronize in the minimum amount of time.

If the cell base stations are not synchronized (as shown in FIGS. 4, 5A–5B), the mobile subscriber unit 25 (step 101) compares the short codes generated from the stored global code seeds (step 103) against the received short code broadcasts from candidate cell base stations. The mobile subscriber unit 25 searches through the stored set of global code seeds (step 105*b*) until a match is found with one that belongs to the base station transceiver serving that particular cell. If a mobile subscriber unit 25 cannot find a match to the broadcast short code (step 107), the mobile subscriber unit 25 does not continue with the short code from that particular base station and tries another (step 109).

If a match is found (step 107), the mobile subscriber unit 25 performs a search to acquire a fast broadcast channel (step 111). The mobile subscriber unit 25 uses the phase information obtained from the short sync code to resolve the phase ambiguity of the global pilot signal and to determine the fast broadcast channel. If the search is not successful (step 113), the mobile subscriber unit 25 tries another global code seed (step 109). The mobile subscriber unit 25 again searches to acquire the global pilot signal (step 115). If the global pilot signal cannot be acquired (step 117) from the short sync code, another global seed is tried (step 109).

Once the mobile subscriber unit 25 acquires a global pilot signal corresponding to a synchronized or non-synchronized candidate cell base station transceiver (step 117), the mobile subscriber unit 25 transmits a symbol length short code to the candidate base station while ramping-up the transmit power level (step 119). As the power level slowly increases, the mobile subscriber unit 25 monitors the transmitting power (step 121) and the reverse traffic light from the candidate base station (step 123) to determine if the candidate transceiver receives and acknowledges the transmitted symbol length short code. The transmission of the short code from the mobile subscriber unit 25 ceases when either the short code transmit power is within the predetermined switching differential comparing the power levels of both communication links, or when the candidate cell base station transceiver acknowledges the detection of the transmitted short code by observing the traffic light (step 123).

If the mobile unit maintains and searches through the whole list of global codes rather than the neighbor list, very often the tested code will not belong to a base station in close proximity. For example, there can be a total of 64 global codes, but a mobile may receive only a few of them from the neighbor base stations.

The decision to handoff is controlled by the mobile subscriber unit 25 which requires less air capacity during handoff than the methods disclosed in the prior art. Since the decision to handoff is controlled by the mobile subscriber unit 25, the system 15 is not fixed as in the prior art. The system 15 is flexible with regard to cell boundaries changing in reaction to air capacity within the individual cells.

The mobile subscriber unit 25 establishes a link to the cell base station that requires the minimum transmit power from the mobile subscriber unit 25 to maintain a communication link. The mobile subscriber unit 25 sends a long access pilot (step 125) to the chosen candidate cell base station including an instruction that is further conveyed to a radio distribution unit. The radio distribution unit keeps record of which base station each mobile subscriber unit is currently associated with. The radio distribution unit routes the communication link from a land line to the appropriate cell base station transceiver as the mobile user negotiates through the various cells. The message sent indicates a handoff.

For this brief moment, the mobile subscriber unit 25 is still linked to the current cell base station transceiver (step 127). The communication link to the original cell base station transceiver controls the transmit power of the mobile subscriber unit 25. However, the candidate cell base station transceiver is also sending power control commands. The power control commands from the candidate cell base station transceiver lower the transmitting power of the mobile subscriber unit 25 in dependence upon the candidate communication link. The mobile subscriber unit 25 abandons (step 129) the first communication link to the current cell base station transceiver and resumes power control and communication from formerly the candidate, now the sole link to a cell base station transceiver (step 131).

Figure 6:
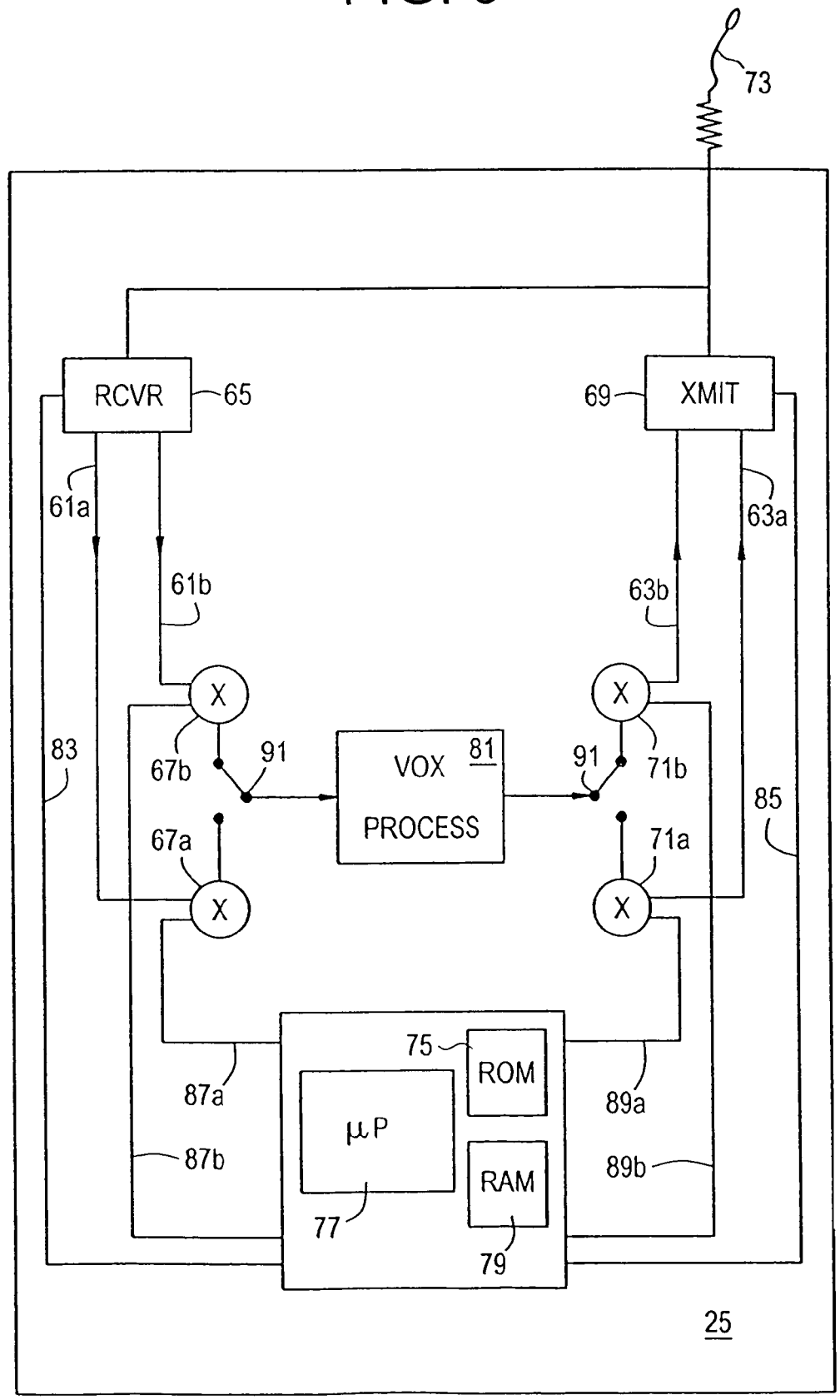
FIG. 6 is the mobile subscriber unit employing the system and method of the present invention.

A system incorporating the method is shown in FIG. 6. As described above, the method requires two separate communication links: 1) an alternative link to search for new candidate base stations 61*a*, 63*a*, and 2) a preexisting communication link 61*b*, 63*b*. The mobile subscriber unit 25 includes a receiver 65 that can despread 67*a*, 67*b* at least two different channels. Maintaining symmetry is a transmitter 69 which can spread 71*a*, 71*b* at least two channels associated with the despreaders 67*a*, 67*b*. While a preexisting communication link is maintained, the mobile subscriber unit 25 receives 73 available broadcasts from candidate base stations.

The present invention stores the seamless handoff process code onboard in ROM 75 and executes the code in a high-speed microprocessor 77 that controls the despreaders 67*a*, 67*b* and spreaders 71*a*, 71*b* such that the global code seeds can be stored and recalled for the immediate neighboring cell sites from RAM 79 to constantly acquire an alternative communication link.

The preexisting communication link 61*b*, 63*b* includes voice processing 81, the discussion of which is beyond the scope of this disclosure. The microprocessor 77 interrogates 83, 85 the receiver 65 and transmitter 69 for monitoring the reception of reply codes from the candidate base stations and also to compare transmission power during the ramping-up step. The process is preprogrammed in ROM 75 and loaded and executed in the microprocessor 77 continuously when the mobile subscriber unit 25 is in operation. When a communication link is found that requires less transmission power, the microprocessor 77 switches 91 to the alternative link 61*a*, 61*b* maintaining constant voice and data transmission while preventing two simultaneous data communications.

The mobile subscriber unit 25 seeks a communication link requiring less transmitting power and is always comparing a prospective communication link with the preexisting communication link. At no point during the process are two communication links established transmitting data. The switching is instantaneous between the current cell base station transceiver and the candidate cell base station transceiver.

As described, the above pertains to a cellular network which has not been sectorized. If sectorization is employed, which effectively multiplies the number of cell base stations, the handoff method of the present invention must be accomplished in much less time. When handing off within sectors of the same cell, the base stations serving the different sectors within the cells are synchronized and a limited search process is performed. A small portion of each global code is searched before doing a comprehensive search encompassing the entire global code. This allows the mobile subscriber unit 25 to acquire a candidate base station in less time.

While the present invention has been described in terms of the preferred embodiment, other variations which are within the scope of the invention as outlined in the claims below will be apparent to those skilled in the art.

What is claimed is:

1. A method for handing-off a mobile unit from a current base station to a candidate base station in a CDMA communication system comprising a plurality of base stations, the method comprising the steps of:

receiving by a mobile unit transmissions from a plurality of candidate base stations, each transmission containing a global pilot code;

acquiring a global pilot code from one of the candidate base stations using global pilot code seed stored in a memory of the mobile unit;

establishing a communication link to the candidate base station from which the mobile unit acquires a global pilot code with a minimum transmit power;

comparing the transmit power to the candidate base station with the transmit power to the current base station; and completing a hand-off from the current base station to the candidate base station if the transmit power to the candidate base station is less than the transmit power to the current base station.

2. The method of claim 1 wherein the step of acquiring a global pilot code from the candidate base station comprises the steps of:

selecting a global pilot code seed from a plurality of global pilot code seed stored in a memory of the mobile unit; and searching for a global pilot code using the selected global pilot code seed to a maximum expected phase shift between the current base station and the candidate base station.

3. The method of claim 2 further comprising synchronizing the mobile unit to the candidate base station.

4. The method of claim 3 wherein the step of synchronizing the mobile unit to the candidate base station comprises the steps of:

selecting a global pilot code seed from a plurality of global pilot code seed stored in a memory of the mobile unit;

acquiring a short sync code from the candidate base station using the selected global pilot code seed;

acquiring a fast broadcast channel based on the phase information obtained from the received short sync code; and acquiring a global pilot code using phase information obtained from the fast broadcast channel.

5. A mobile unit for obtaining a hand-off from a current base station to a candidate base station in a CDMA communication system, the mobile unit comprising:

means for receiving transmissions from a plurality of candidate base stations, each transmission containing a global pilot code;

means for acquiring a global pilot code from one of the candidate base stations using global pilot code seed stored in a memory of the mobile unit;

means for establishing a communication link to the candidate base station from which the mobile unit acquires a global pilot code with a minimum transmit power;

means for comparing the transmit power to the candidate base station with the transmit power to the current base station; and means for completing a hand-off from the current base station to the candidate base station if the transmit power to the candidate base station is less than the transmit power to the current base station.

6. The mobile unit of claim 5 wherein the means for acquiring a global pilot code from the candidate base station comprises:

means for selecting a global pilot code seed from a plurality of global pilot code seed stored in a memory of the mobile unit; and means for searching for a global pilot code using the selected global pilot code seed to a maximum expected phase shift between the current base station and the candidate base station.

7. The mobile unit of claim 6 further comprises means for synchronizing the mobile unit to the candidate base station.

8. The mobile unit of claim 7 wherein the means for synchronizing the mobile unit to the candidate base station comprises:

means for selecting a global pilot code seed from a plurality of global pilot code seed stored in a memory of the mobile unit;

means for acquiring a short sync code from the candidate base station using the selected global pilot code seed;

means for acquiring a fast broadcast channel based on the phase information obtained from the received short sync code; and means for acquiring a global pilot code using phase information obtained from the fast broadcast channel.

* * * * *